United States Patent [19]
Thamodharan et al.

[11] Patent Number: 6,087,629
[45] Date of Patent: Jul. 11, 2000

[54] CONTROL SYSTEM FOR AN ARC WELDING MACHINE

[75] Inventors: Manoharan Thamodharan, 2808 Binkley Ave. #209, Dallas, Tex. 75205-2455; Hans-Peter Beck, Goslar, Germany

[73] Assignee: Manoharan Thamodharan, Dallas, Tex.

[21] Appl. No.: 09/122,295

[22] Filed: Jul. 24, 1998

[30] Foreign Application Priority Data

May 7, 1998 [DE] Germany ............................ 198 22 130

[51] Int. Cl.[7] ...................................................... B23K 9/09
[52] U.S. Cl. .................................. 219/137 PS; 219/130.51
[58] Field of Search ............................ 219/130.51, 130.1, 219/130.5, 130.33, 137.71, 137 PS

[56] References Cited

U.S. PATENT DOCUMENTS

| | | | |
|---|---|---|---|
| 3,683,149 | 8/1972 | Mages et al. ........................ | 219/130.51 |
| 3,849,627 | 11/1974 | Blavier ................................. | 219/137.71 |
| 4,247,752 | 1/1981 | Stringer ............................... | 219/130.33 |
| 4,467,174 | 8/1984 | Gilliland ............................... | 219/130.1 |
| 5,611,950 | 3/1997 | Tochino et al. ....................... | 219/130.1 |

FOREIGN PATENT DOCUMENTS 925849  3/1955  Germany ............................. 219/130.1

Primary Examiner—Clifford C. Shaw
Attorney, Agent, or Firm—Factor & Partners

[57] ABSTRACT

The invention comprises a control system for Arc Welding for steady and pulsed direct current welding with a single three-phase bridge converter (1) For steady direct current welding, output DC voltage ($V_d$) and current ($1_d$) are varied through the tapping of transformer (2). Finer voltages can be obtained through the variation of firing angles $\alpha$ of the thyristors of the converter (1). The contemplated control system can also be used for pulsed DC current welding with an impured dynamic response with less effort. The background current, which lies between the maximum and minimum firing angle $\alpha$ of the thyristors of the converter (1), is set by the transformation ratio of the transformer (2) and the pulsed current is superimposed thereon through the relatively rapid changing of the firing angle $\alpha$.

22 Claims, 5 Drawing Sheets

100% = 28.76 A

100 % = 17.96 A

100 % = 29.53 A

100 % = 24.45 A

CONTROL SYSTEM FOR AN ARC WELDING MACHINE

BACKGROUND OF THE INVENTION

1. Field of the Invention

The present invention relates to a control system for arc welding. Such arc welding may be used to weld all types of steels, cast iron, cast steel and non-ferrous materials, such as, for example, aluminum.

2. Background Art

It is well known in the art that the following circuits can be used for conventional power sources for steady direct current welding: a) an uncontrolled bridge converter with a transformer with tapping wherein the DC output voltage is varied by means of the tapping See, generally, Baun, L. and Fichter, V.: Der Schutzgasschweisser, Teil II: MIG-/MAG-Schweissen, Deutscher Verlag fuer Schweisstechnik (DVS) GmbH, Duesseldorf, 1990, p. 23; b) half/fully-controlled bridge converter with a transformer having a constant transformer ratio. The DC output voltage can be changed continuously by varying the firing angle of the thyristors. generally, Baum, L. and Fichter, V.: Der Schutzgasschweisser, Teil II: MIG-/MAG-Schweissen, Deutscher Verlag fuer Schweisstechnik (DVS) GmbH, Duesseldorf, 1990, p. 25; or c) a combination of a transformer with tapping and a half/fully-controlled bridge converter. See, generally, Munske, H.; Handbuch des Schutzgasschweissens, Teil II; Elektrotechnische Grundlagen-Schweissanlagen und Einstellpraxis, Deutscher Verlag fuer Schweisstechnik (DVS) GmbH, Duesseldorf, 1970, p. 61.

In addition to the above-described steady direct current welding, pulsed direct current welding is also known in the prior art. In particular the power source for pulsed DC welding generally comprises two parallel-connected converters, wherein each may be connected to separate transformers with tapping, or both may be connected to a single transformer with a constant transformation ratio. A three-phase uncontrolled/half-/fully-controlled bridge converter generates the background direct current and the single-phase converter produces the pulsed direct current. The values of the background and pulsed direct current can be determined by the transformation ratios of the transformers and/or by the firing angle of the thyristors. The Pulse frequencies that can be derived from this power source are 25, 33 1/3, 50 and 100 Hz. The Pulsewidth can be changed by altering the firing angle α of the thyristors of the single-phase converter. See, generally, Baum, L. and Fichter, V.; Der Schutzgasschweisser, Teil II; MIG-/MAG-Schweissen, Deutscher Verlag fuer Schweisstechnik (DVS) GmbH, Duesseldorf, 1990, p. 26; and Munske, H.; Handbuch des Schutzgasschweissens, Teil II; Elektrotechnische Grundlagen-Schweissanlagen und Einstellpraxis, Deutscher Verlag fuer Schweisstechnik (DVS) GmbH, Duesseldorf, 1970, p. 87.

Both of the above-identified power sources produce harmonics in the AC mains. In particular, in the case of a DC pulsed current welding power source, the single-phase converter causes distortion in the AC mains and low dynamic response. Further, disadvantages associated with pulsed power source include, but are limited to, high power loss, low efficiency, large weight and volume, the requirement of more electrical components (and the associated complexity thereof). All of these features serve to render such device complex to operate and maintain.

Thus, it is an object of the present invention to provide a control system which enables steady and pulsed direct current, with a three-phase converter having fewer electrical components and while exhibiting a relatively high dynamic response. Moreover, it is further an object of the present invention to compensate for the distortions in the AC mains.

Indeed, through such a system as will be explained, it is possible to weld both with steady and pulsed direct current with a single three-phase converter having fewer electrical components and a high dynamic response. With such a system, the power source can be easily constructed and further, it occupies less space as compared to the known systems in the art. Moreover, it provides a simple over-current protection and it can be used for serial production. The distortions in the AC mains are kept minimum with the use of filters.

Additional advantages of the invention will become clear in light of the Specification and Claims.

SUMMARY OF THE INVENTION

The invention comprises a method for controlling a DC converter arc welding system having a converter, the method comprising the steps of: (a) tapping a transformer having a transformation ratio, the transformer is connected to an AC main, which, in turn, allows the transformer to supply the converter with a preliminary voltage and a preliminary current at a predetermined firing angle; (b) selecting a desired one of a steady DC current welding mode and a pulsed DC current welding mode; (c) wherein the desired mode comprises one of a steady DC current welding mode, the method further includes the step of varying the firing angle of the thyristors to, in turn, fine tune the preliminary voltage and current; and (d) wherein the desired mode comprises one of a pulsed DC current welding mode, the method further includes the step of setting a base current through the transformation ratio of the transformer; and rapidly changing the firing angle of the thyristors to form a pulsed current, which, in turn, superimposes the pulsed current onto the base current.

In a preferred embodiment, the method further includes the step of protecting the DC current arc welding system from a current that exceeds a predetermined elevated value. In such a preferred embodiment, the step of protecting further comprises the step of removing the firing pulses to ignite (also sometimes referred to as the triggering of pulses to activate) the thyristors of the converter through the activation of an electronic trip circuit. In yet another such preferred embodiment, the step of protecting further includes the step of sensing that the current exceeds a predetermined operational value, and diverting the current away from the converter and to a freewheel diode, which facilitates dissipation of the current. In such a preferred embodiment the step of protecting further includes separating the transformer from operable connection with the activation of a circuit breaker associated with the AC mains and the transformer. In one embodiment, the step of separating occurring at such time as the diverting of the current can no longer protect the system.

In another preferred embodiment, the method further comprises the step of minimizing at least one of the naturally occurring harmonic currents and unsymmetrical currents in the AC main.

In another preferred embodiment, the method further includes the step of eliminating the distortions in the AC mains through activation of at least one of an active and passive filter.

The invention further comprises a DC arc welding system comprising a converter, means for tapping a transformer;

and means for selectively controlling the transformer. The transformer is operably associated with an AC main which is capable of supplying a current to generate a welding arc. The selective control means controls the converter in one of a steady DC current welding mode and a pulsed DC current welding mode. The selective controlling means comprises means for varying the firing angle of the thyristors of the converter in the steady DC current welding mode as well as means for rapidly changing the firing angle of the thyristors of the converter in a pulsed DC current welding mode.

In a preferred embodiment, the system further includes means for protecting the converter should the current exceed a predetermined value. In such an embodiment, the converter protection means comprises an electronic trip circuit associated with the converter. The converter includes a freewheel diode. The electronic trip circuit is capable of directing the current away from the converter and through the freewheel diode, thereby dissipating the current. In such a preferred embodiment, the converter comprises one of the BC6F type. In another such preferred embodiment, the protecting means comprises a circuit breaker associated with the converter and the AC main. The circuit breaker is capable of separating the system from the AC main if the current exceeds a predetermined value. In another such preferred embodiment, the freewheel diode is replaced with a thyristor operably connected in parallel to a smoothing choke.

In another preferred embodiment, the system further includes means for minimizing the harmonic currents and the unsymmetrical currents in the AC mains. In such a preferred embodiment, the minimizing means comprises at least two parallel-connected resistors. In another such embodiment, the minimizing means comprises a delta-star connection of the transformer with at least one of a compensation coil and at least one filter. In such an embodiment, the at least one filter comprises at least two filters having parallel-connected resistors.

In another preferred embodiment, the system further includes means for eliminating distortions in the AC mains during a pulsed welding mode. The distortion eliminating means comprising an active filter operably connected between the AC main and the transformer.

In another preferred embodiment, the converter comprises a pulse bridge converter. In one embodiment, the converter comprises a 12 pulse bridge converter.

BRIEF DESCRIPTION OF THE DRAWINGS

The invention can be explained through brief description of the following drawings.

DETAILED DESCRIPTION OF THE NEW INVENTION

Figure 1:
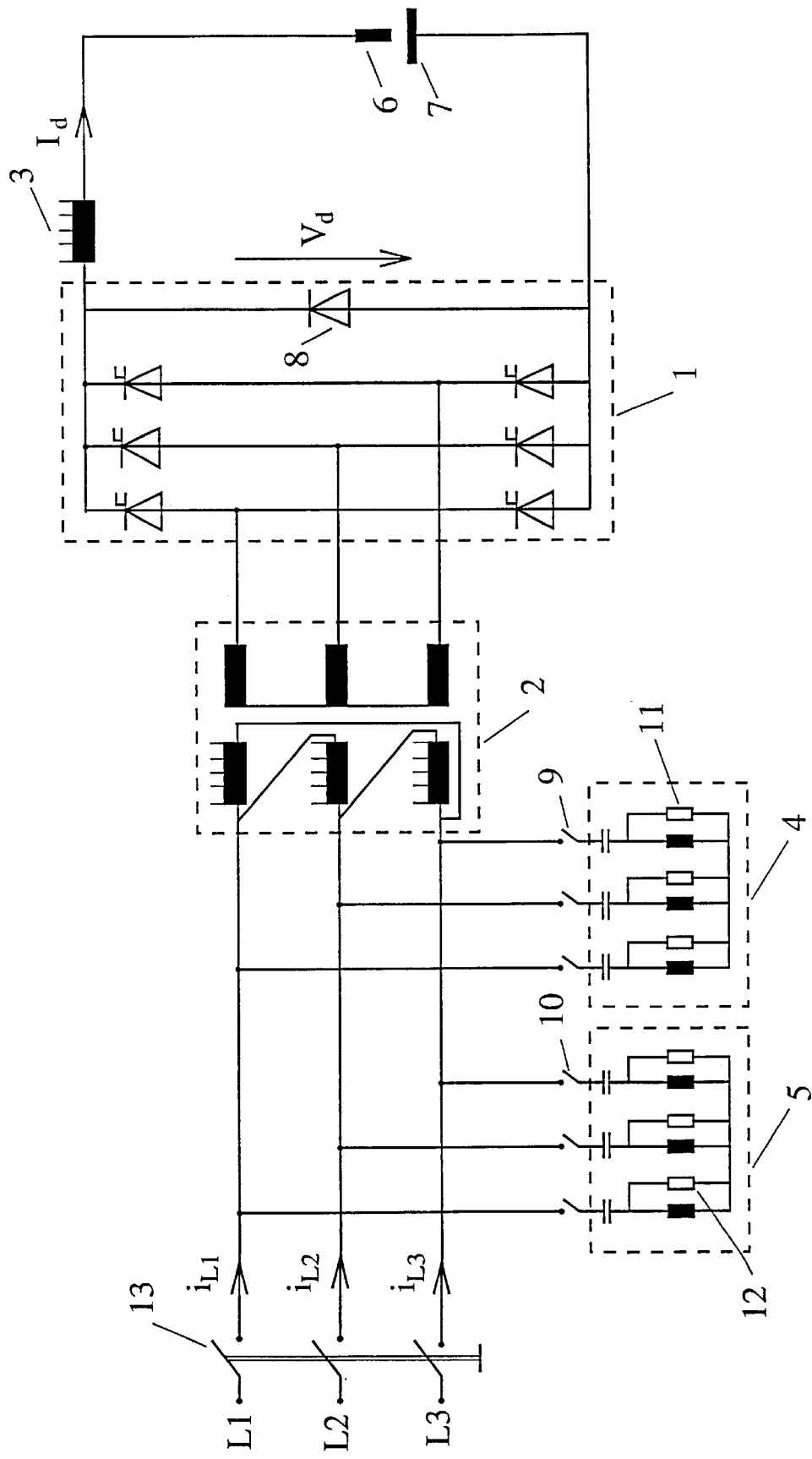
FIG. 1 shows the circuit of the invention.

While this invention is susceptible of embodiment in many different forms, there is shown in the drawings and will be described in detail, a specific embodiment with the understanding that the present disclosure is to be considered as an exemplification of the principles of the invention and is not intended to limit the invention to the embodiments illustrated.

FIG. 1 shows circuit of the power source, as comprising a three-phase bridge controlled converter 1 with freewheel diode (BC6F) 8, a three phase welding transformer with tapping on its primary side 2, a smoothing choke with tapping 3 and two filters 4 and 5 connected to the three-phase AC current (L1, L2, L3). Also, cathode 7 and anode 6 can be seen in FIG. 1. While the system will be explained with respect to a European Network (50 Hz, 400 V three-phase voltage), it will be understood to one of skill in the art that the principles of the invention are equally adaptable to different electrical supplies such as those in the United States.

The transformer 2 has a delta-star connection. This connection eliminates the third harmonics (150 Hz) and it multiples from the AC mains. The BC6F-Bridge converter 1 reduces the reactive power with firing angle α beyond 60°. For firing angles less than 60°, the DC voltage of the converter is always positive, and the freewheel diode does not come into operation. As the firing angle advances beyond this point, the load current starts to freewheel through the diode, thus cutting off the input line current, and preventing the DC voltage from swinging into the negative direction. This, in turn, reduces the amount of reactive power drawn from the mains. As a result, the power factor is improved.

The freewheel diode 8 plays a vital role in the limitation of the short-circuit current which generates the welding arc and also a vital role in a fault situation. In both these cases, the current is commutated in the freewheel diode and eases following a logarithmic function. The smoothing choke with tapping 3 smoothens the welding DC current and produces a minimal power loss.

To further suppress the reactive power and harmonics, two series resonant shunt filters 4 and 5 tuned to predetermined harmonic frequencies are used. Preferably, the filters are tuned to different harmonic frequencies. Both steady direct and pulsed direct current welding is possible with the control system and the above circuit.

Figure 2:
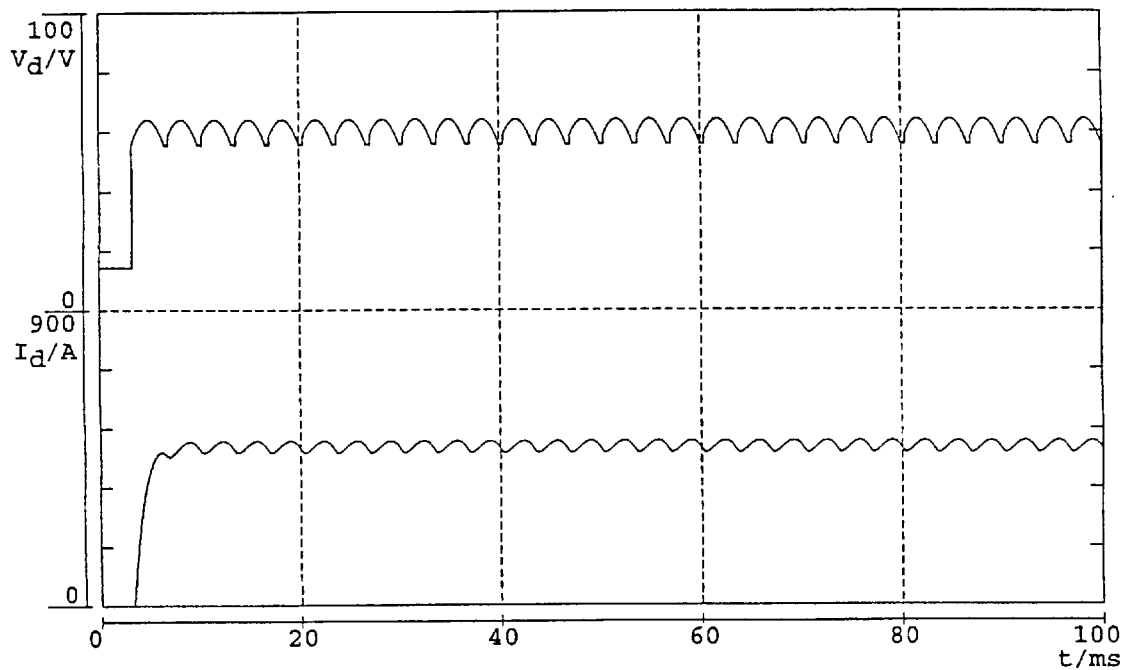
FIG. 2 shows the output DC voltage and current with steady direct current welding.

With respect to a steady direct current welding mode, the DC voltage and current are varied continuously by means of the transformation ratio of the welding transformer. In particular, the voltage and current waveforms for the transformation ratio a=0.07 is shown in FIG. 2. Finer voltages can be derived by varying the firing angle α of the thyristors of the converter 1.

The variation of firing angle generates $5^{th}$, $7^{th}$, $9^{th}$, $11^{th}$, $13^{th}$, etc. harmonics in the alternating current. Apart from this, reactive power is produced. To suppress the harmonics and to reduce reactive power, filter 4 can be switched on by means of switch 9 during steady direct current welding. In this particular test that was undertaken, the filter was tuned to the $5^{th}$ harmonic frequency (250 Hz) because of its large amplitude. Of course another harmonic can be tuned, as required, and as understood by those with ordinary skill in the art.

Figure 3:
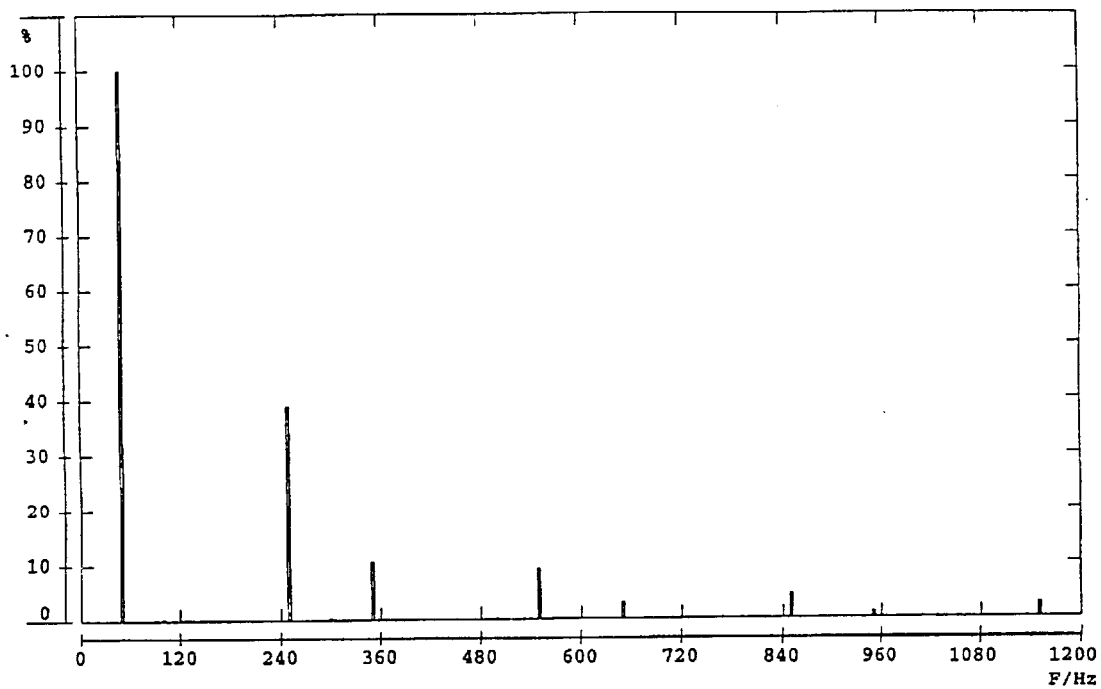
FIG. 3 shows the Fourier spectrum of the AC main current with steady direct current welding without filter.
Figure 4:
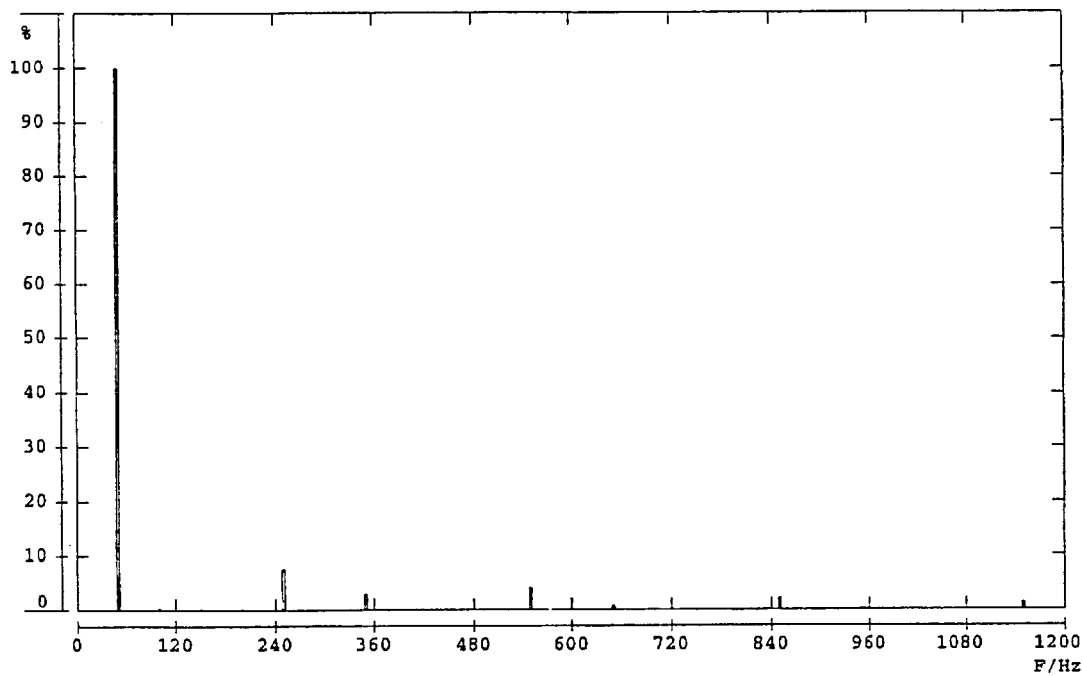
FIG. 4 shows the Fourier spectrum of the AC main current with steady direct current welding with filter.

The resistor 11 connected parallel to an L-C filter, which determines the broad band filter effect. Specifically, with the help of the given ratio of the active power loss through the resistance and the reactive power of the filter, the broad band filter effect can be determined. While not required, this ratio is preferably kept small. More illustratively, FIG. 3 shows the Fourier spectrum of the AC main current without filter 4 and FIG. 4 shows with filter 4 at the firing angle of α=60°. It has been observed that with the use of filter 4 the harmonics were reduced by 50% with this particular test.

With respect to a pulsed DC current welding mode, the base current, which lies between the maximum and minimum firing angle α of the thyristors of the converter 1, is set by the transformation ratio of the transformer. The pulsed current is superimposed on this base current by means of an instant change in firing angle α. An instant change in firing angle causes the DC voltage and current to vary. A rapid decrease of the firing angle α rapidly increases the output voltage and current whereas a rapid increase of the firing angle rapidly decreases the output voltage and current. This enables the periodic production of the pulsed and base current. While not limited thereto, the firing angle, which lies between $0° \leq \alpha \leq 60°$ is sufficient to produce the required pulsed current.

Figure 5:
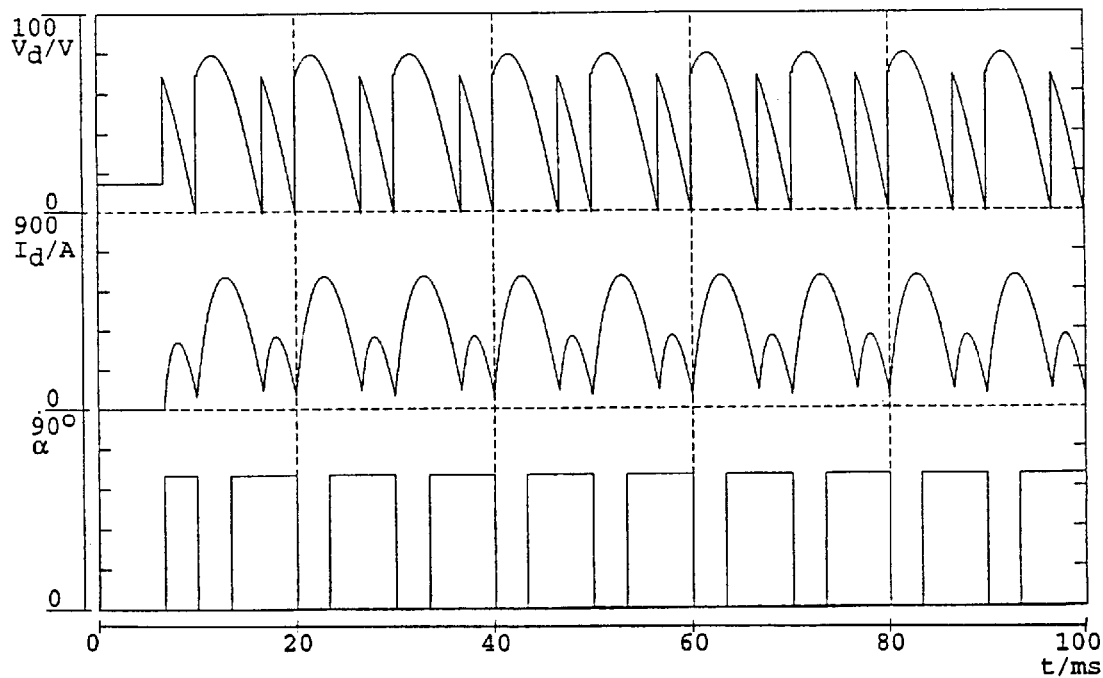
FIG. 5 shows the output DC voltage, DC current and delay firing angle with pulsed direct current welding with a pulsefrequency of 100 Hz.
Figure 6:
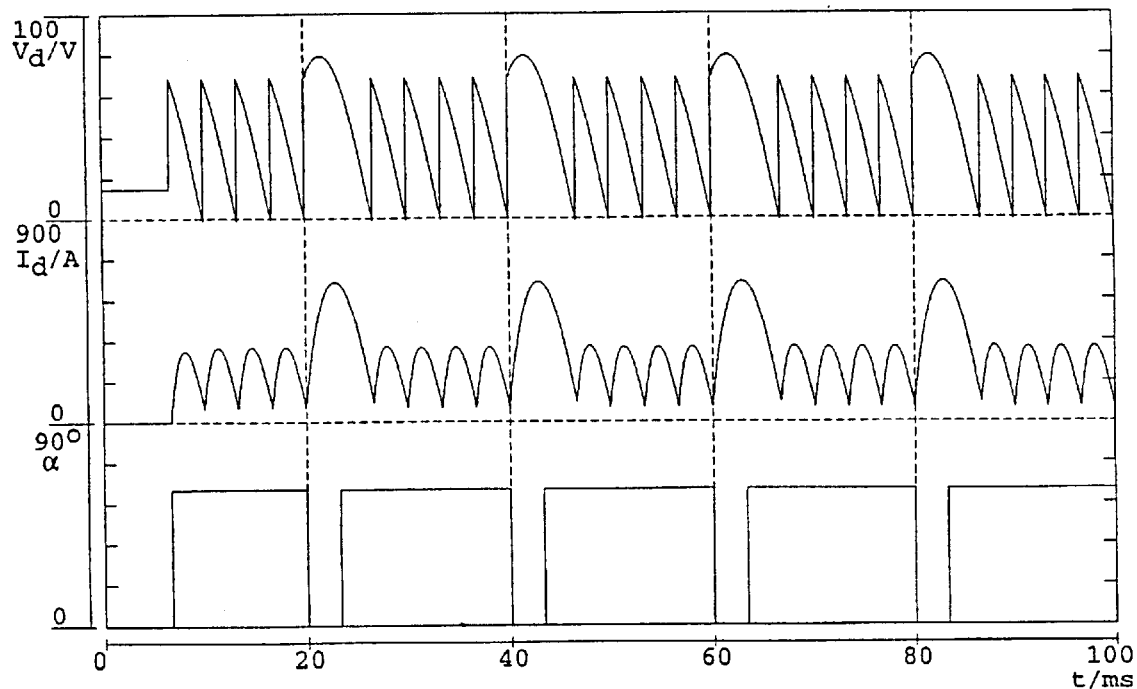
FIG. 6 shows the output DC voltage, DC current and delay firing angle with pulsed direct current welding with a pulsefrequency of 50 Hz.

The common welding parameters, namely, pulsed current, background current, pulsewidth and pulsefrequency can be obtained through such a means of an instant change in firing angle. Many common pulsefrequencies include 150 Hz, 100 Hz, 50 Hz, 33 1/3 Hz and 25 Hz. The desired pulse current to background current ratio can be derived through this control system as will be understood. The value of the smoothing choke determines the rise and fall of the pulse current. More illustratively, FIG. 5 shows an example of a pulsefrequency of $f_p$=100 Hz, and, FIG. 6 shows the pulsefrequency of $f_p$=50 Hz.

Figure 7:
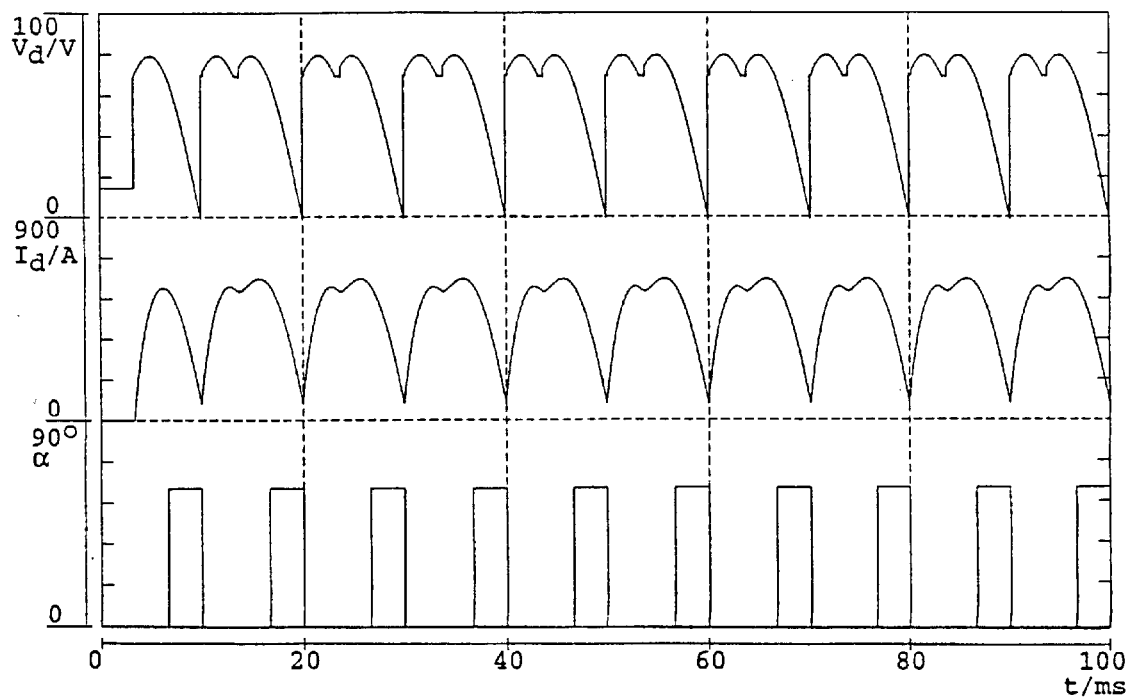
FIG. 7 shows the output DC voltage, DC current and delay firing angle with pulsed direct current welding with a pulsefrequency of 100 Hz and pulsewidth of 6.6 ms.

The pulsewidth can be varied between 3.3 ms (FIG. 5) and 6.6 ms (FIG. 7). As can be seen, and as is evident in each of FIG. 5, FIG. 6 and FIG. 7, the firing angle is rapidly changed symmetrically and time dependently to achieve the different pulsewidth and pulseheight. However, other pulsewidths including, smaller pulsewidths are also possible. The dynamic response can be further enhanced by using higher pulsed circuits (e.g. 12 pulsed bridge converter).

Figure 8:
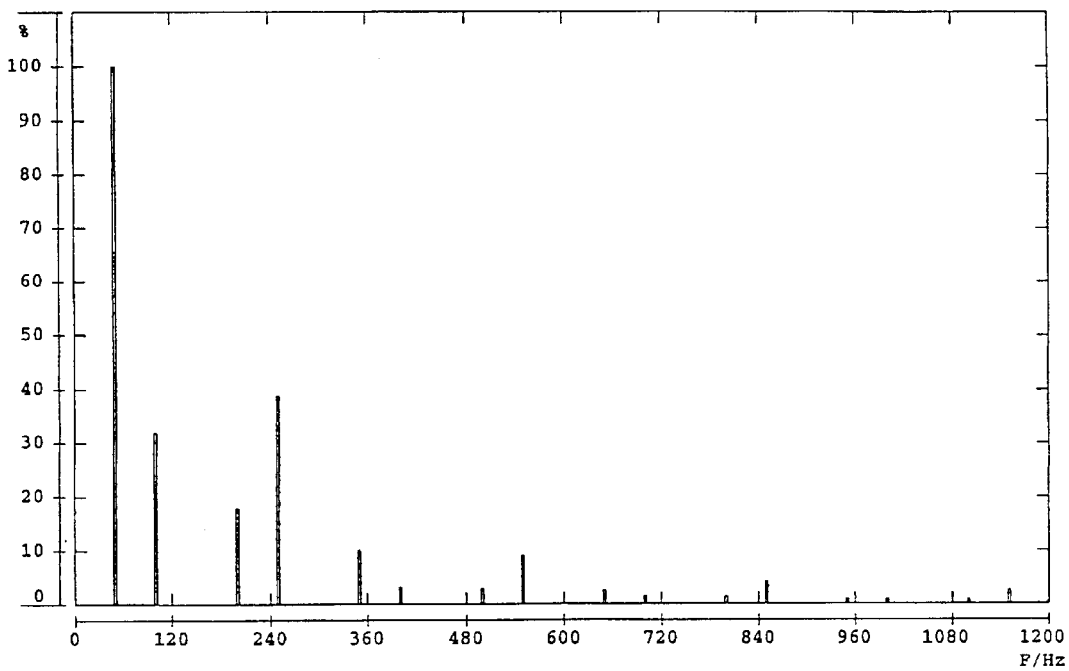
FIG. 8 shows the Fourier spectrum of the AC main current with pulsed direct current welding with a pulsefrequency of 50 Hz and pulsewidth of 3.3 ms without filter.
Figure 9:
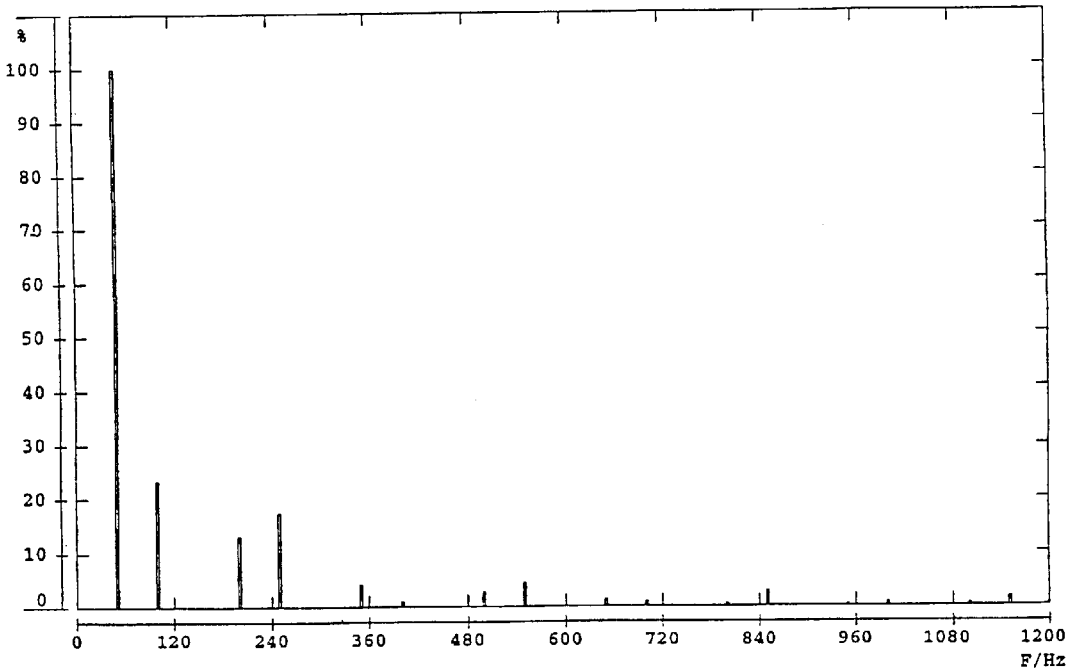
FIG. 9 shows the Fourier spectrum of the AC main current with pulsed direct current welding with a pulsefrequency of 50 Hz and pulsewidth of 3.3 ms with filter.

Pulse welding with different pulsefrequencies generates different harmonics on the AC side. To reduce the harmonics produced by pulsed welding, filter 5 which tuned to the $2^{nd}$ harmonic frequency (100 Hz) is energized through switch 10. The reason to tune to this frequency is that this harmonic frequency is generated with almost all pulsefrequencies. The value of the resistor 12 can be determined exactly as in the case of resistor 11 in filter 4. Illustratively, FIGS. 8 and 9 show the Fourier analysis of the AC current when undergoing pulsed welding having a pulsefrequency of 50 Hz and pulsewidth of 3.3 ms without and with the use of filter 5, respectively. It clearly indicates that the harmonics are reduced to approximately 30%. Of course, further tuning and experimentation using this process can achieve even greater reductions, as will be understood by one with ordinary skill in the art.

Overcurrent protection can be achieved through various conventional means, including a electronic trip circuit and circuit breaker 13. The electronic trip circuit removes the firing pulses which ignite the thyristors of the converter when the current exceeds a preset value set to generate the welding arc. The circuit breaker 13 protects the welding machine, for example, the transformer 2, against overcurrent and thermal overload (overheating). While other methods are contemplated, overcurrent protection can be carried out selectively, first by means of the electronic trip circuit and then with the help of the circuit breaker.

Accordingly, the invention shows that welding with steady and pulsed DC current with a single three-phase converter can be achieved with a reduction of the number of electrical components used while requiring less circuitry effort. Moreover, the power source is robust, occupies less space, light, produces less AC main distortion and provides a non-complex, yet exceedingly strong protection.

Through selective use of filter 4 when welding with steady DC current, and, filter 5 when welding with pulsed DC current, the harmonics can be reduced about 30 to 50%, if not even further. Of course, filters of other sorts can also be used to reduce harmonics.

The foregoing description and drawings merely explain and illustrate the invention, and the invention is not limited thereto, as those skilled in the art who have the disclosure before them will be able to make modifications and variations to the system without departing from the scope of the invention.

What I claim is:

1. A method for controlling a DC current arc welding system having a converter, the method comprising:
    tapping a transformer, having a transformation ratio, the transformer operably connected to an AC main, to, in turn, allow the transformer to supply the converter with a preliminary voltage and a preliminary current;
    triggering pulses at a predetermined firing angle to at least one thyristor;
    selecting a desired one of a steady DC current welding mode and a pulsed DC current welding mode;
    wherein if the desired selected mode comprises one of a steady DC current welding mode, the method further includes the step of:
        varying the firing angle of the at least one thyristor of the converter, to, in turn, fine tune the preliminary voltage and current;
    wherein if the desired selected mode comprises one of a pulsed DC current welding mode, the method further includes the step of:
        setting a base current through the transformation ratio of the transformer; and
        rapidly changing the firing angle symmetrically of the at least one thyristor of the converter time dependently to form a pulsed current, which in turn, superimposes the pulsed current onto the base current.

2. The method according to claim 1 further comprising the step of:
    protecting the DC current arc welding system from a current that exceeds a predetermined elevated value.

3. The method according to claim 2 wherein the step of protecting the DC current arc welding system comprises the step of:
    ceasing the triggering of pulses from the at least one thyristor to activate the at least one thyristor of the converter through the activation of an electronic trip circuit.

4. The method according to claim 2 wherein the step of protecting the DC current arc welding system comprises the steps of:

sensing that the current exceeds a predetermined operational value; and diverting the current away from the converter and to a freewheel diode, which, in turn facilitates the dissipation of the current.

5. The method according to claim 4 wherein the step of protecting the DC current arc welding system comprises the step of:

separating the transformer from operable connection with the AC main, through the activation of a circuit breaker associated with the AC mains and the transformer, the step of separating occurring at such time as the diverting of the current can no longer protect the system.

6. The method according to claim 2 wherein the step of protecting the DC current arc welding system comprises the step of:

separating the transformer from operable connection with the AC main, through the activation of a circuit breaker associated with the AC mains and the transformer.

7. The method according to claim 1 further comprising the step of:

minimizing at least one of the naturally occurring harmonic currents and unsymmetrical currents in the AC Main.

8. The method according to claim 1 further comprising the step of:

eliminating the distortions in the AC mains through activation of at least one of an active and passive filter.

9. A DC arc welding system comprising:

a converter;

means for tapping a transformer, the transformer operably associated with an AC main capable of supplying a current to generate a welding arc; and means for selectively controlling the converter in one of a steady DC current welding mode and a pulsed DC current welding mode, wherein the selective controlling means comprises means for varying a firing angle of the at least one thyristor of the converter in the steady DC current welding mode and the selective controlling means comprises means for rapidly changing the firing angle symmetrically of the at least one thyristor of the converter time dependently in a pulsed DC current welding mode.

10. The DC arc welding system according to claim 9 further including means for protecting the converter should the current exceed a predetermined value.

11. The DC arc welding system according to claim 10 wherein the converter protecting means comprises an electronic trip circuit associated with the converter having a freewheel diode, wherein the electronic trip circuit is capable of directing the current away from the converter and through the freewheel diode, to dissipate same.

12. The DC arc welding system according to claim 11 wherein the converter comprises one of the BC6F (fully controlled three-phase bridge converter with a freewheel diode) type.

13. The DC arc welding system according to claim 11 wherein the protecting means further comprises a circuit breaker associated with the converter and the AC Main, the circuit breaker capable of separating the system from the AC Main if the current exceeds a predetermined value.

14. The DC arc welding system according to claim 11 further comprising a thyristor operably connected in parallel to a smoothing choke, in place of the freewheel diode.

15. The DC arc welding system according to claim 10 wherein the protecting means comprises a circuit breaker associated with the converter and the AC Main, the circuit breaker capable of separating the system from the AC Main if the current exceeds a predetermined value.

16. The DC arc welding system according to claim 9 further including means for minimizing at least one of harmonic currents and unsymmetrical currents in the AC Mains.

17. The DC arc welding system according to claim 16 wherein the minimizing means comprises at least two parallel-connected resistors.

18. The DC arc welding system according to claim 16 wherein the minimizing means comprises a delta-star connection of the transformer with at least one of a compensation coil and at least one filter.

19. The DC arc welding system according to claim 18 wherein the at least one filter comprises two filters having parallel-connected resistors.

20. The DC arc welding system according to claim 9 further including means for eliminating distortions in the AC mains during a pulsed welding mode, the distortion eliminating means comprising an active filter operably connected between an AC main and the transformer.

21. The DC arc welding system according to claim 9 wherein the converter comprises a pulse bridge converter.

22. The DC arc welding system according to claim 9 wherein the converter comprises a 12 pulse bridge converter.

* * * * *